(12) United States Patent
Miura

(10) Patent No.: US 11,046,368 B2
(45) Date of Patent: Jun. 29, 2021

(54) SHOCK-ABSORBING MEMBER AND MANUFACTURING METHOD THEREOF

(71) Applicant: TOYOTA SHATAI KABUSHIKI KAISHA, Kariya (JP)

(72) Inventor: Toshihisa Miura, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 1 day.

(21) Appl. No.: 16/640,330

(22) PCT Filed: Aug. 24, 2018

(86) PCT No.: PCT/JP2018/031312
§ 371 (c)(1),
(2) Date: Feb. 19, 2020

(87) PCT Pub. No.: WO2019/058867
PCT Pub. Date: Mar. 28, 2019

(65) Prior Publication Data
US 2021/0070372 A1    Mar. 11, 2021

(30) Foreign Application Priority Data

Sep. 25, 2017   (JP) .............................. JP2017-183851

(51) Int. Cl.
*B60J 7/00*   (2006.01)
*B62D 25/08*   (2006.01)
(Continued)

(52) U.S. Cl.
CPC ............ *B62D 25/088* (2013.01); *B29C 45/14* (2013.01); *B60R 19/26* (2013.01); *F16F 7/12* (2013.01)

(58) Field of Classification Search
CPC .......... A01B 35/20; A01B 43/00; B67D 9/02; E01C 11/126; C08L 97/02; E04C 3/292;
(Continued)

(56) References Cited

U.S. PATENT DOCUMENTS 4,272,114 A * 6/1981 Hirano ...................... F16F 7/12
188/377
10,953,826 B1* 3/2021 Miura ...................... B60R 19/03
(Continued)

FOREIGN PATENT DOCUMENTS

CN        204126198 U    1/2015
JP        2005-001158 A  1/2005
(Continued)

OTHER PUBLICATIONS

Chinese Patent Office Action dated Dec. 2, 2020 for Chinese Patent Application No. 2018800540862 (11 pages).

*Primary Examiner* — Kiran B Patel
(74) *Attorney, Agent, or Firm* — Christensen, Fonder, Dardi & Herbert PLLC

(57) ABSTRACT

In a shock-absorbing member in which a wood member is embedded in a resin covering member so as to be integrated therewith and in which the wood member is collapsed when subjected to an impact load, thereby absorbing a portion of the impact load, sealing members are disposed between both end surfaces of the wood member in an axis direction of annual rings and an inner surface of the covering member, so as to hermetically cover both end surfaces of the wood member.

5 Claims, 6 Drawing Sheets

(51) Int. Cl.
*B29C 45/14* (2006.01)
*B60R 19/26* (2006.01)
*F16F 7/12* (2006.01)

(58) Field of Classification Search
CPC ........... B65D 2519/00293; B65D 2519/00562; B65D 2519/00273
See application file for complete search history.

(56) References Cited

U.S. PATENT DOCUMENTS

| | | | |
|---|---|---|---|
| 2016/0272137 A1* | 9/2016 | Nishimura | F16F 7/003 |
| 2019/0084512 A1* | 3/2019 | Takayanagi | B60R 19/22 |
| 2019/0111974 A1* | 4/2019 | Takayanagi | B62D 25/04 |
| 2019/0143919 A1* | 5/2019 | Miura | B60R 19/22 293/120 |
| 2019/0232906 A1* | 8/2019 | Eriksson | B60R 19/22 |
| 2019/0382057 A1* | 12/2019 | Takayanagi | B62D 21/157 |
| 2020/0263752 A1* | 8/2020 | Miura | F16F 7/12 |

FOREIGN PATENT DOCUMENTS

| | | |
|---|---|---|
| JP | 2013-141936 A | 7/2013 |
| JP | 2014-184899 A | 10/2014 |
| JP | 2016-200233 A | 12/2016 |
| WO | WO 2014/077314 A1 | 5/2014 |

\* cited by examiner

SHOCK-ABSORBING MEMBER AND MANUFACTURING METHOD THEREOF

CROSS-REFERENCE TO RELATED APPLICATIONS

The present application is a 35 U.S.C. § 371 National Phase entry of, and claims priority to, PCT Application No. PCT/JP2018/031312, filed Aug. 24, 2018, which in turn claims priority to Japanese Patent Application No. 2017-183851, filed Sep. 25, 2017, both of which are hereby incorporated herein by reference in their entireties for all purposes.

BACKGROUND

The disclosure relates to a shock-absorbing member in which a wood member is collapsed when subjected to an impact load, thereby absorbing a portion of the impact load, and a manufacturing method thereof.

In a shock-absorbing member in which a wood member is used, there is a problem that shock-absorbing performance of the wood member may be changed due to changes in usage environment or other such conditions. For example, depending on whether the wood member is hardened and cracked due to dryness or whether the wood member is placed in a softened condition by moisture, the wood member may be changed in how to collapse when subjected to an impact load. As a result, shock-absorbing performance of the wood member may be changed. In order to reduce such a problem, in a shock-absorbing member taught by JP2016-200233A, a wood member is placed in a closed resin container in order to prevent a moisture content of the wood member from being changed. However, in such a structure in which the wood member is received in the closed resin container, a manufacturing method thereof may need steps of molding a container having an opening by injection molding, inserting the wood member into the container through the opening, and closing and sealing the opening of the container after insertion of the wood member. This may lead to increased costs.

As a method to solve the problem, the art described in, for example, JP2005-1158A may be used. Using this method, the wood member may be embedded in a resin covering member when the covering member is die molded. In particular, as shown in FIG. 9, in the art described in JP2005-1158A, a lot of spherical resin materials 104 melted by heat (about 220 degrees C.) are put in a lower die 101 while a wood member 105 is positioned on slide pins 101p projected from a bottom surface of the lower die 101. Thereafter, the resin materials 104 are additionally put on the wood member 105 before an upper die 102 is lowered while pressing down the slide pins 101p into the bottom surface of the lower die 101. As a result, as shown in FIG. 10, in a process in which the upper die 102 and the lower die 101 are mated, the wood member 105 is covered by the resin materials 104 while the covering member is molded. This structure may be reduced in cost relative to the structure in which the wood member is placed in the resin container.

However, the wood member may contain air along with moisture. Therefore, when the wood member is heated by heat from the melted resin materials (about 220 degrees C.), the air may flow out of the wood member due to evaporation of moisture and expansion of air. The air may primarily flow out from end surfaces of the wood member in an axis direction of annual rings of the wood member. Therefore, when using the method described in JP2005-1158A, the air may accumulate between the end surfaces of the wood member in the axis direction of annual rings and inner surface of the covering member covering the wood member, so that the covering member may partially inflate. This may reduce a molding accuracy of the covering member covering the wood member.

Thus, there is a need in the art to provide an improved shock-absorbing member and a manufacturing method thereof.

SUMMARY

A first aspect of the disclosure may provide a shock-absorbing member in which a wood member is embedded in a resin covering member so as to be integrated therewith and in which the wood member is collapsed when subjected to an impact load, thereby absorbing a portion of the impact load, wherein sealing members are disposed between both end surfaces of the wood member in an axis direction of annual rings and an inner surface of the covering member, so as to hermetically cover both end surfaces of the wood member.

According to the aspect, both end surfaces of the wood member in the axis direction of the annual rings are hermetically covered by the sealing members. Therefore, even if air in the wood member expanded by heat from melted resin materials is forced to flow out of the wood member during injection molding, the air can be blocked by the sealing members, so as to be prevented from flowing out of the end surfaces of the wood member. As a result, the air may be prevented from accumulating between the end surfaces of the wood member and the inner surface of the covering member, so that molding defects of the covering member caused by inflation may be avoided.

In a second aspect of the disclosure, the sealing members are coating materials, films or plate members adhered to the end surfaces of the wood member. When the coating materials or the films are used, the end surfaces of the wood member may be sealed at low costs. Further, when the plate members are used, in contrast to the coating materials, there is no need to take time for drying.

In a third aspect of the disclosure, one end side of the covering member covering one end side of the wood member in the axis direction of the annual rings is configured to be connected to a vehicle bumper reinforcement member, and another end side of the wood member in the axis direction of the annual rings and another end side of the covering member covering another end side of the wood member are configured to be inserted into a tubular side member extending in a vehicle front-back direction and to contact an insertion-limiting stopper disposed in the side member. Therefore, the wood member may receive the impact load between the bumper reinforcement member and the insertion-limiting stopper of the side member, so as to be axially collapsed. Further, because another end side of the shock-absorbing member is configured to be inserted into the side member, the shock-absorbing member may be prevented from being inclined relative to the side member when subjected to the impact load.

In a fourth aspect of the disclosure, the covering member has flanges respectively formed in one axial end side and an axial mid portion thereof and protruded therefrom in directions perpendicular to an axial center of the wood member, and the flange formed in one end side of the covering member is configured to be connected to the bumper reinforcement member while the flange formed in the mid portion of the covering member is configured to be connected to a flanged portion of the side member. Because the covering member is provided with the flanges, the wood member may be positioned at a predetermined position between the bumper reinforcement member and the side member.

A fifth aspect of the disclosure may provide a manufacturing method of a shock-absorbing member in which a wood member is embedded in a resin covering member so as to be integrated with the covering member and in which the wood member is collapsed when subjected to an impact load, thereby absorbing a portion of the impact load, which may include the steps of covering both end surfaces of the wood member in an axis direction of annual rings by sealing members; setting the wood member of which the end surfaces in the axis direction of the annual rings are covered by the sealing members in a molding tool of an injection molding machine; and closing the molding tool of the injection molding machine and injecting melted resin materials into the molding tool so as to mold the covering member.

DETAILED DESCRIPTION

Embodiment 1

Figure 1:
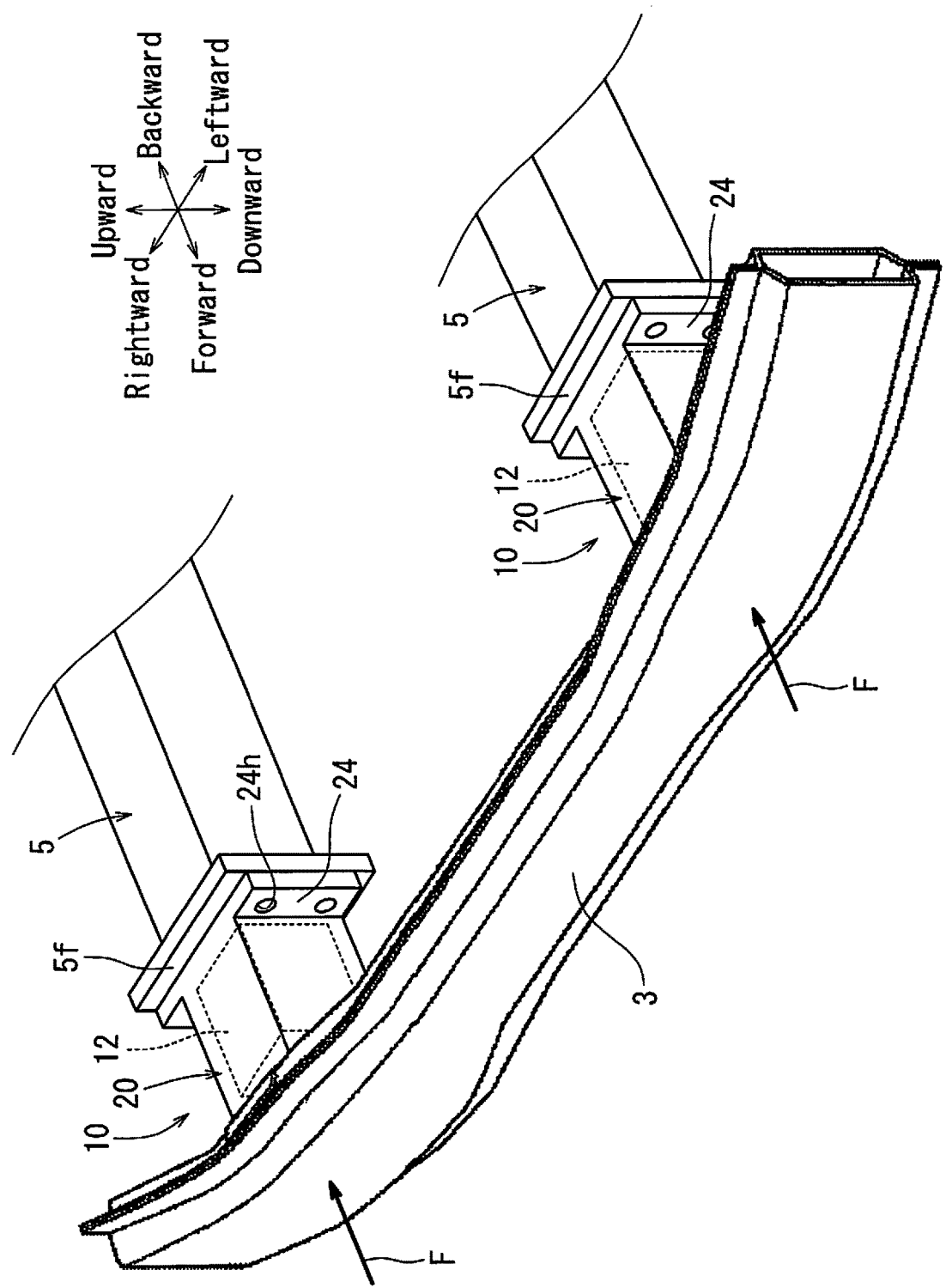
FIG. 1 is an overall perspective view of a shock-absorbing member according to Embodiment 1 of the disclosure, showing a condition in which the shock-absorbing member is attached to a vehicle.

Below, vehicle shock-absorbing members according to Embodiment 1 of this disclosure will be described with reference to FIG. 1 to FIG. 8. As shown in FIG. 1, the vehicle shock-absorbing members 10 according to the present embodiment may be members that are disposed between a bumper reinforcement member 3 of a front bumper and side members 5 positioned on widthwise both sides (right and left sides) and extending in a vehicle front-back direction, so as to absorb an impact load F at the time of a vehicle frontal collision. The shock-absorbing members 10 may be. Further, forward, backward, rightward, leftward, upward and downward directions described with reference to the figures may respectively correspond to forward, backward, rightward, leftward, upward and downward directions of a vehicle.

<Regarding Shock-Absorbing Members 10>

Figure 3:
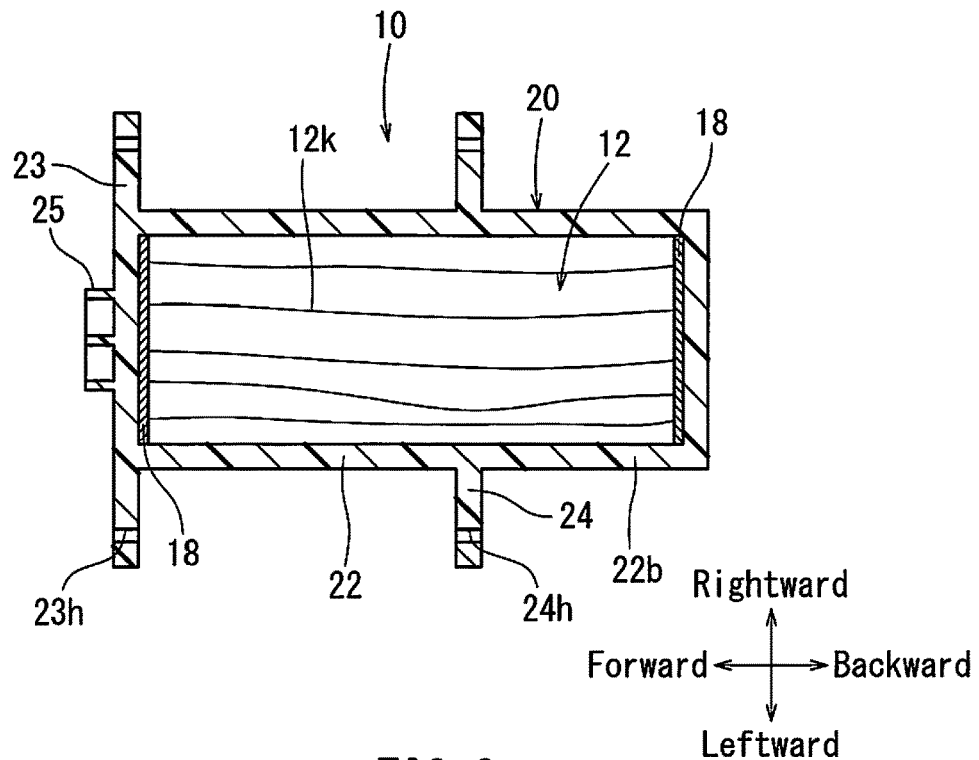
FIG. 3 is a horizontal sectional view of the vehicle shock-absorbing member (a sectional view taken along line of FIG. 2).
Figure 4:
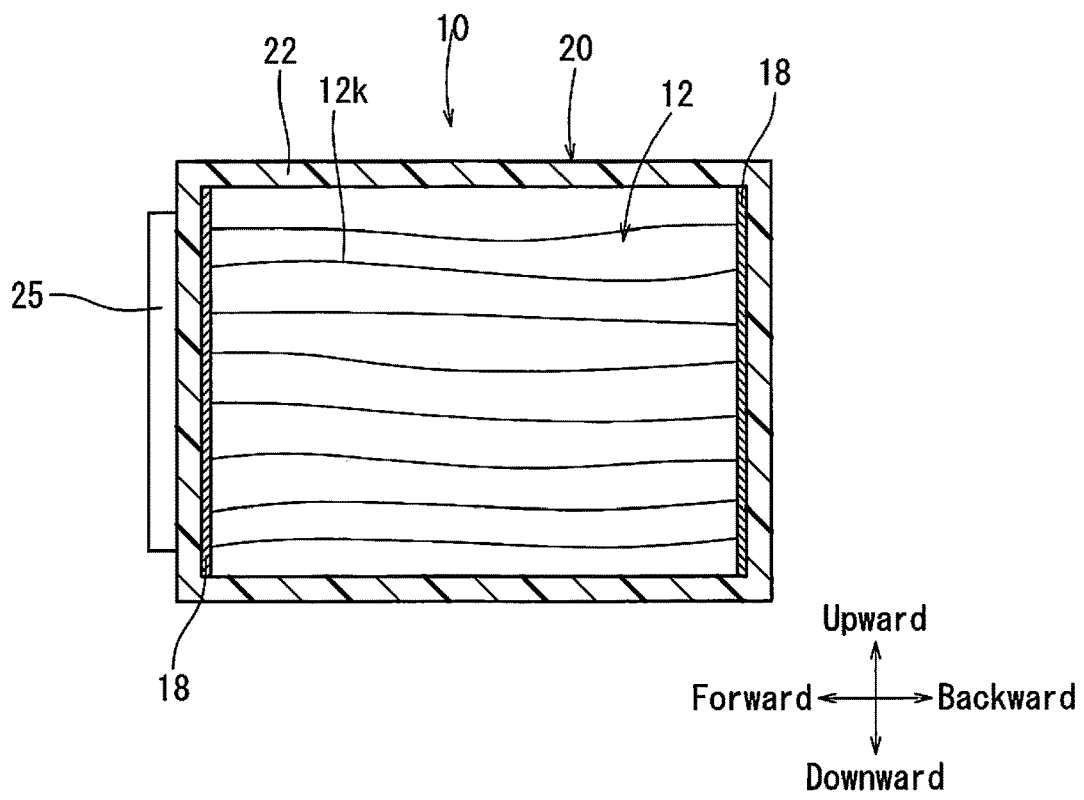
FIG. 4 is a vertical sectional view of the vehicle shock-absorbing member (a sectional view taken along line IV-IV of FIG. 2).

As shown in FIG. 3 and FIG. 4, the shock-absorbing members 10 may respectively be composed of rectangular columnar wood members 12, sealing members 18 hermetically covering both end surfaces of the wood members 12 in an axis direction of annual rings 12$k$, and resin covering members 20 integrally covering the wood members 12. As shown in FIG. 3, each of the wood members 12 may be formed such that the axis direction of the annual rings 12$k$ is aligned with an axis direction of a rectangular column, so as to receive the impact load F in the axis direction of the annual rings 12$k$. That is, the impact load F may be received by a portion of the wood members 12 having a high compressive strength. Therefore, the impact load F at the time of the vehicle collision may be absorbed by the wood members 12 even if the impact load F is relatively large. Further, the wood member 12 may preferably be formed of, for example, cedar wood (specific gravity of 0.38). Further, a size of the wood member 12 may be set to, for example, a height of 70 mm, a width of 38 mm and a length of 75 mm.

<Regarding Sealing Members 18>

Figure 5:
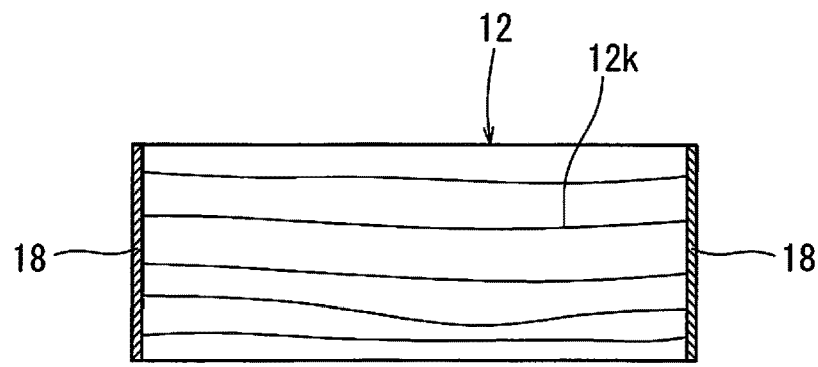
FIG. 5 is a horizontal sectional view showing a manufacturing process of the vehicle shock-absorbing member.

The sealing members 18 may be used to prevent air in the wood members 12 expanded by heat from resin materials from flowing out when each of the covering members 20 is molded by resin injection molding by setting each of the wood members 12 in a molding tool 30 (which will be hereinafter described) of an injection molding machine. The sealing members 18 may be made of epoxy resin coating materials. As shown in FIG. 5, the epoxy resin coating materials may be applied to both end surfaces of each of the wood members 12 in the axis direction of the annual rings 12$k$ before each of the wood members 12 is set in the molding tool 30. Further, air may diffuse only a little from a circumferential surface of each of the wood members 12, i.e., surfaces parallel to an axial center of the annual rings 12$k$. Therefore, there is little need to apply the epoxy resin coating materials to the circumferential surface of each of the wood members 12. Further, the wood members 12 may be, for example, vacuum-packed by resin films instead of using the epoxy resin coating materials. Alternatively, metal plates or resin plates may be adhesively attached to both end surfaces of each of the wood members 12 in the axis direction of the annual rings 12$k$, so as to ensure a hermetic condition therein.

<Regarding Covering Members 20>

Figure 2:
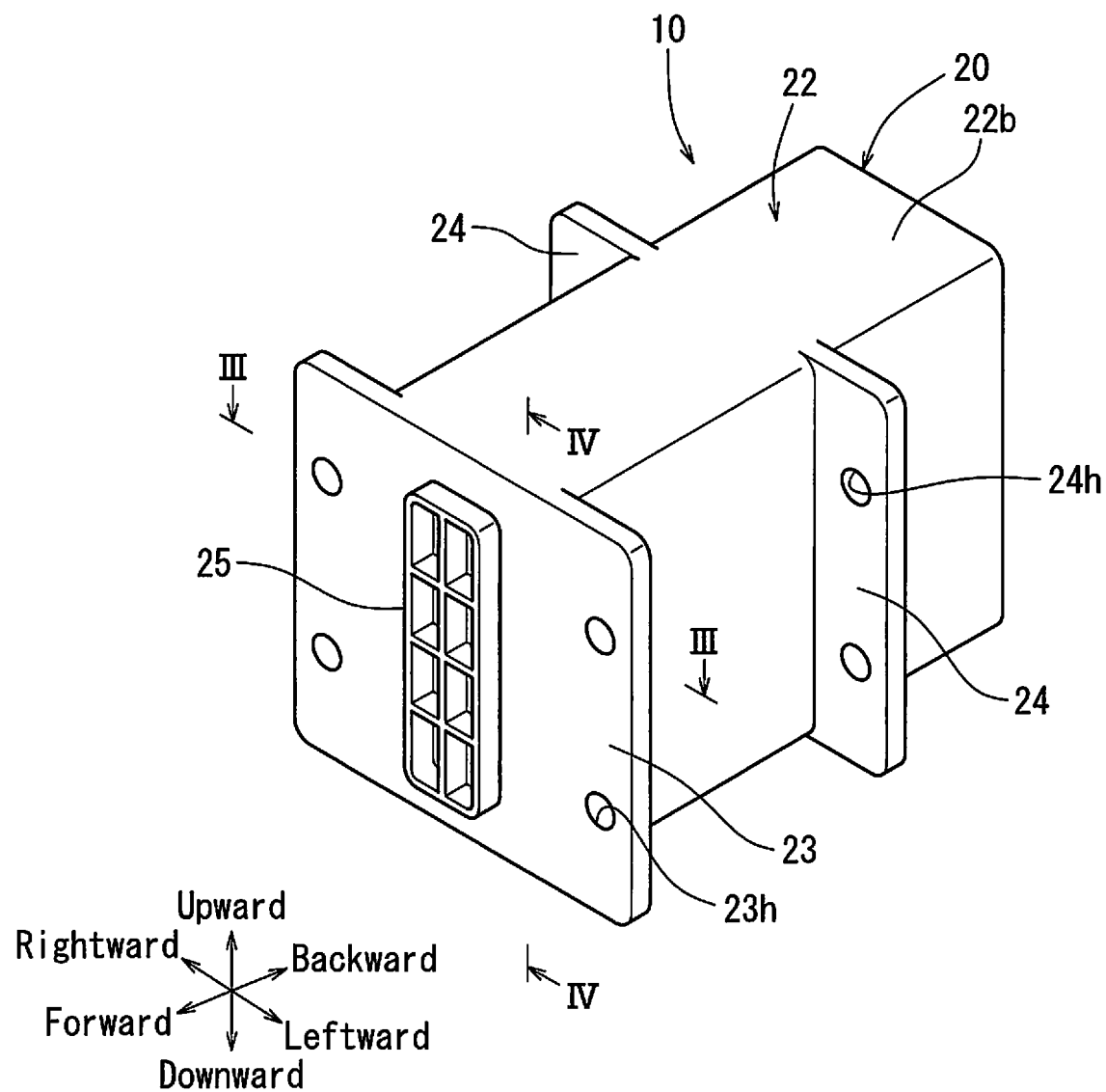
FIG. 2 is a perspective view of the vehicle shock-absorbing member.

As shown in FIG. 2, the covering members 20 may be members that fully cover the wood members 12 such that a moisture content of the wood members 12 may be prevented from being changed due to humidity level in a usage environment. Further, the covering members 20 may function to position the wood members 12 in place between the bumper reinforcement member 3 and the side members 5. The covering members 20 may be injection molded resin products. As shown in FIG. 2 to FIG. 4, the covering members 20 may respectively be composed of rectangular case-like covering bodies 22 configured to cover the wood members 12 and having a substantially uniform wall thickness, front flanges 23 formed in front end surfaces of the covering bodies 22, and rear flanges 24 formed in axial mid portions of the covering bodies 22. That is, rear portions 22$b$ of the covering bodies 22 may project backward relative to the rear flanges 24. As shown in FIG. 2 and FIG. 3, the front flanges 23 and the rear flanges 24 may respectively be formed in right and left side surfaces of each of the covering bodies 22, so as to protrude therefrom in directions perpendicular to the axial center of the annual rings 12k of each of the wood members 12.

Figure 7:
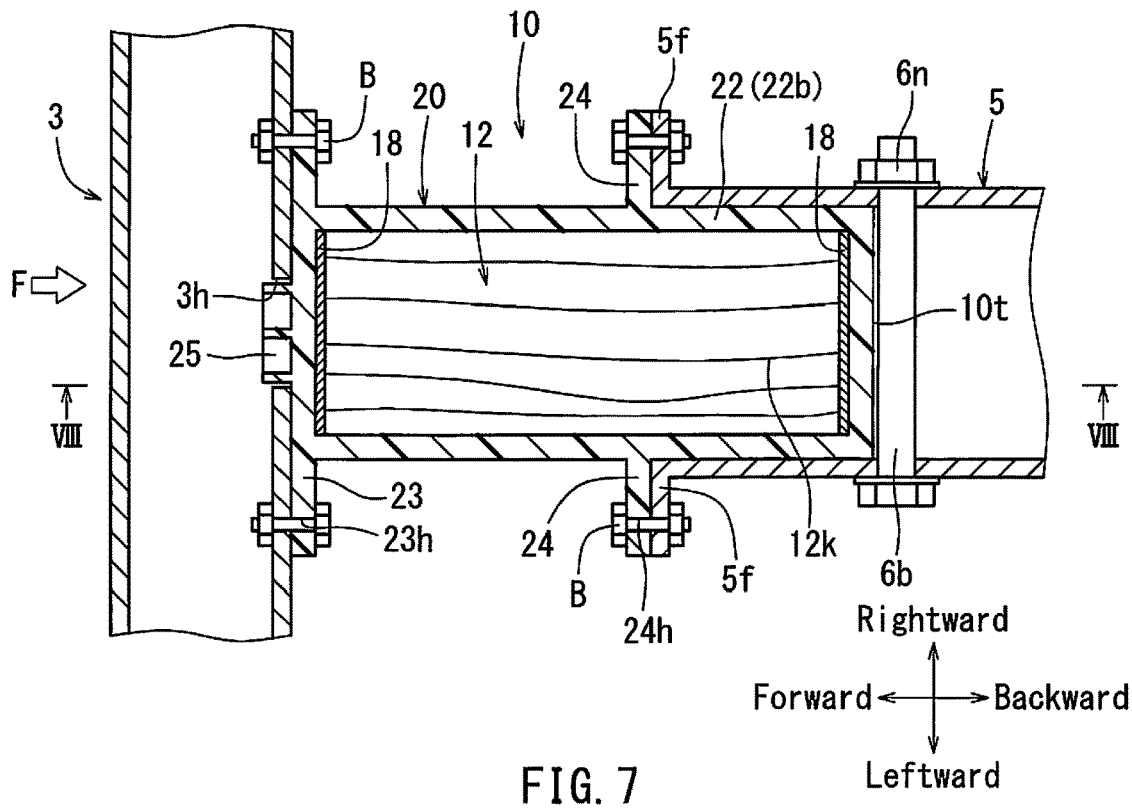
FIG. 7 is a horizontal sectional view showing an attaching structure of the vehicle shock-absorbing member.

As shown in FIG. 2, the front flanges 23 of the covering members 20 may have positioning projections 25 formed in central portions thereof and having a vertically elongated rectangular shape. The positioning projections 25 may respectively be configured to fit in positioning holes 3h formed in the bumper reinforcement member 3. Further, a right end periphery and a left end periphery of each of the front flanges 23 may respectively have bolt holes 23h formed therethrough and vertically spaced away from each other, so that the front flanges 23 may be connected to the bumper reinforcement member 3 by bolts B using the bolt holes 23h. As shown in FIG. 7 and other figures, the rear portions 22b of the covering bodies 22 of the covering members 20 may respectively be sized so as to be inserted into the side members 5. Further, a right end periphery and a left end periphery of each of the rear flanges 24 of the covering members 20 may respectively have bolt holes 24h formed therethrough and vertically spaced away from each other. Therefore, the rear flanges 24 of the covering members 20 may respectively be connected to flanged portions 5f of the side members 5 by bolts B in a condition in which the rear portions 22b of the covering members 20 (the covering body 22) are inserted into the side members 5.

Thermoplastic resins may be used to form the covering members 20. Examples of the thermoplastic resins are polyolefin resins such as polypropylene and polyethylene, polycarbonate resins, polyester resins such as polyethylene terephtalate and polybutylene terephtalate, polystyrene resins, and acrylic resins.

<Regarding Manufacturing Method of Shock-Absorbing Members 10>

Figure 6:
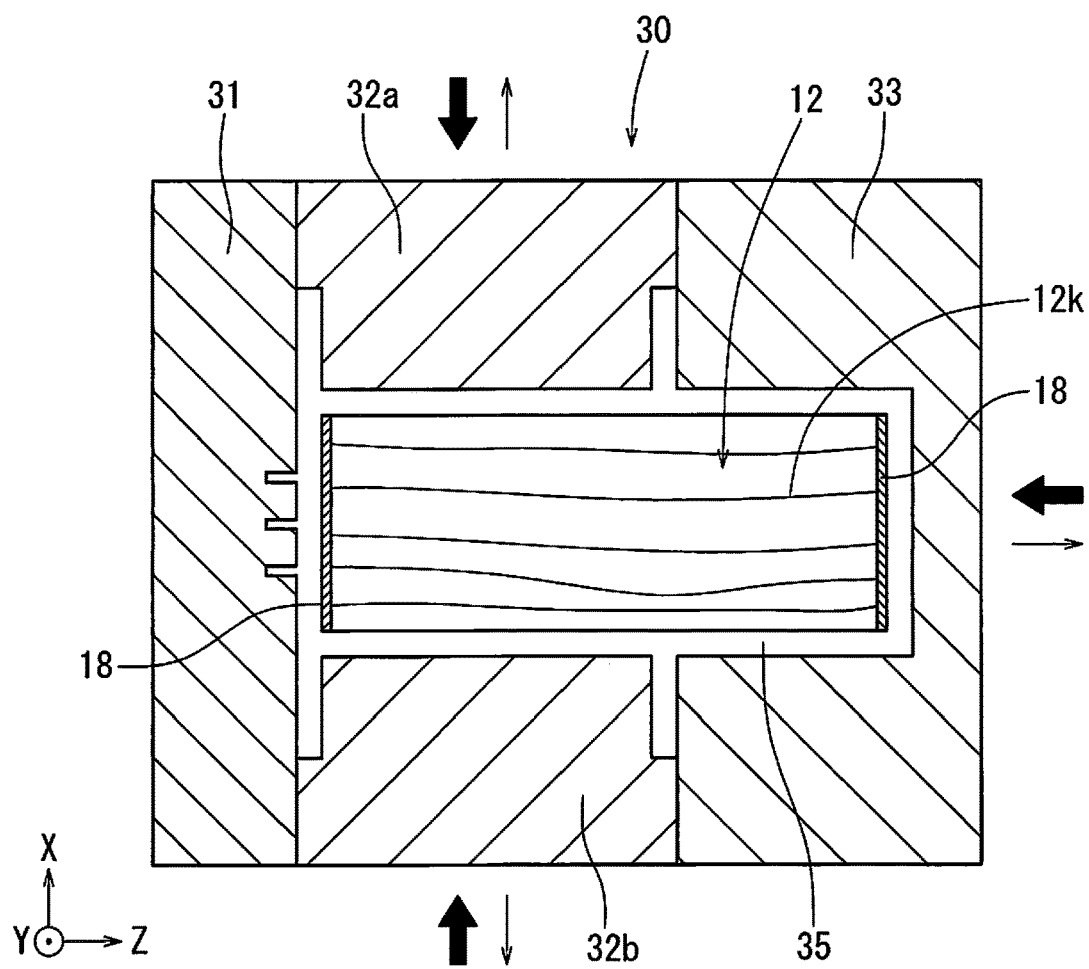
FIG. 6 is a schematic horizontal sectional view of a molding tool that is used in the manufacturing process of the vehicle shock-absorbing member.

As shown in FIG. 5, first, the wood members 12 may be formed into a rectangular columnar shape. At this time, each of the wood members 12 may be formed such that the axis direction of the annual rings 12k is aligned with the axis direction of the rectangular column. Next, the epoxy resin coating materials may be applied to both end surfaces of each of the wood member 12 in the axis direction of the annual rings 12k in order to form the sealing members 18 therein. As shown in FIG. 6, after the epoxy resin coating materials is dried, each of the wood members 12 may be set on the molding tool 30 of the injection molding machine. The molding tool 30 may include a stationary die 31, a pair of laterally movable dies 32a, 32b capable of moving in an X-direction relative to the stationary die 31, and an axially movable die 33 capable of moving in a Z-direction relative to the stationary die 31.

In particular, each of the wood members 12 may be placed on a predetermined position in the molding tool 30 in a condition in which the laterally movable dies 32a, 32b and the axially movable die 33 respectively move in directions indicated by thin arrows in FIG. 6 relative to the stationary die 31, i.e., in a condition in which the molding tool 30 is opened. Next, the laterally movable dies 32a, 32b and the axially movable die 33 respectively move in directions indicated by thick arrows relative to the stationary die 31, so that the molding tool 30 is closed. As a result, a cavity 35, i.e., a space in which each of the covering members 20 is to be molded, may be defined within the molding tool 30. Further, positioning pins which position each of the wood members 12 in the predetermined position in the molding tool 30 and a plurality of injection ports through which the resin materials are injected into the cavity may be omitted in FIG. 6.

When the molding tool 30 is closed as described above, the resin materials melted by heat may be injected into the molding tool 30 under a predetermined pressure. At this time, each of the wood members 12 set in the molding tool 30 may be heated by heat from the resin materials, so that the air may be forced to flow out of each of the wood members 12 due to evaporation of moisture contained in each of the wood members 12 and to expansion of the air. However, the air cannot flow out of each of the wood members 12 because the epoxy resin coating materials are applied to both end surfaces of each of the wood member 12 in the axis direction of the annual rings 12k so as to form the sealing members 18 therein.

After the resin materials injected into the molding tool 30 are solidified (a cooling-down period of 15 seconds), the molding tool 30 may be opened, so that each of the covering members 20 in which each of the wood members 12 is embedded is removed from the molding tool 30. As previously described, because the sealing members 18 may prevent the air contained in each of the wood members 12 from flowing out of each of the wood members 12, the air may be prevented from accumulating between the resin materials and the end surfaces of each of the wood members 12 when the resin materials are solidified. This may prevent molding defects in each of the covering members 20 caused by inflation. Similarly, even if the resin films, the metal plates, the resin plates or other such members are used as the sealing members 18 instead of the epoxy resin coating materials, the molding defects of each of the covering members 20 caused by inflation may be well prevented. Further, in each of the covering members 20, the bolt holes 23h of the front flange 23 and the bolt holes 24h of the rear flange 24 may respectively be formed in a post-injection process.

<Regarding Attachment of Shock-Absorbing Members 10 to Vehicle>

Figure 8:
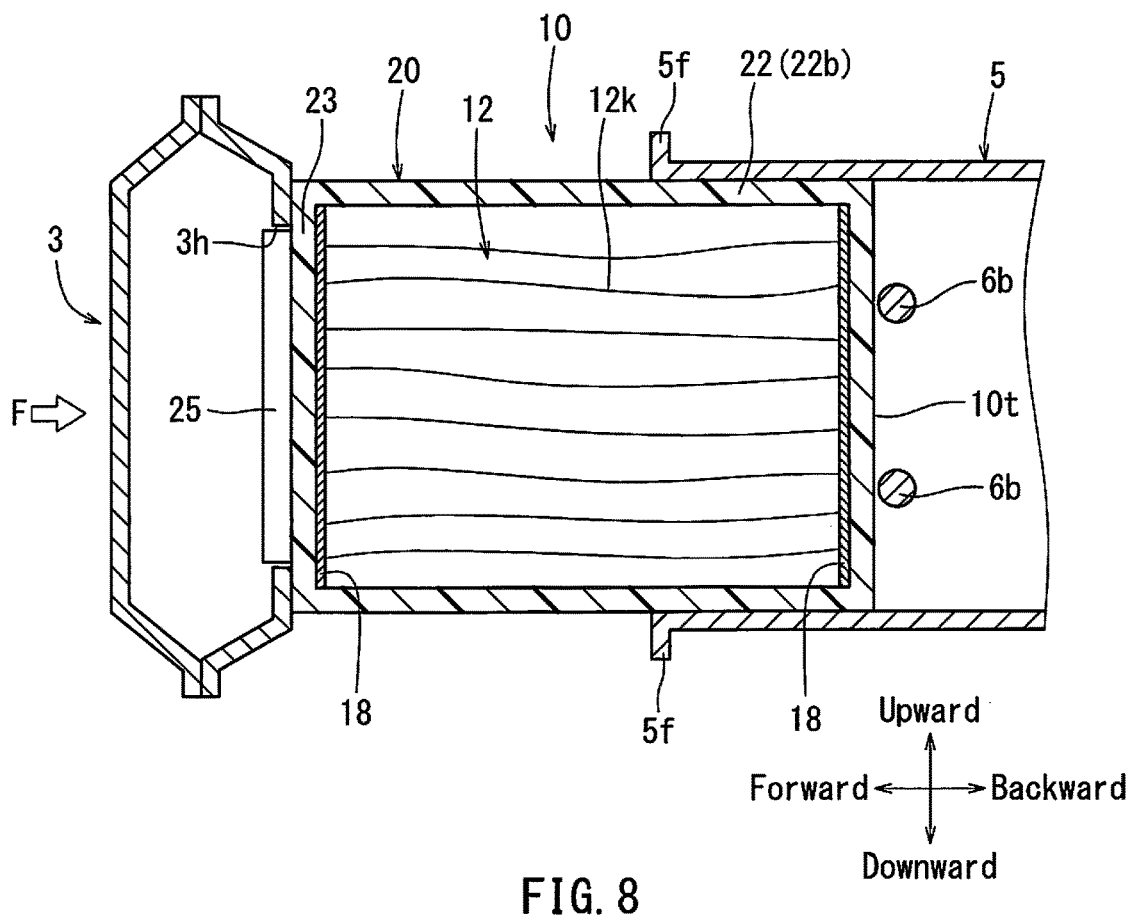
FIG. 8 is a vertical sectional view showing the attaching structure of the vehicle shock-absorbing member.
Figure 9:
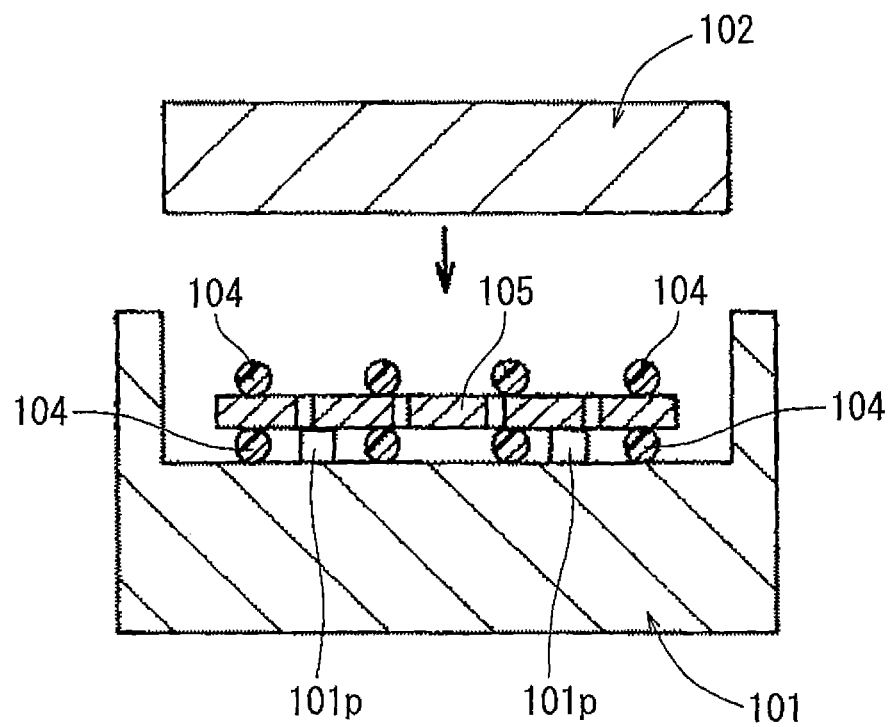
FIG. 9 is a vertical sectional view of a molding tool that is used to form a conventional resin-covered wood member.
Figure 10:
FIG. 10 is a vertical sectional view of the resin-covered wood member.

As shown in FIG. 7 and FIG. 8, the side members 5 to which the shock-absorbing members 10 are attached may be formed to have a rectangular tubular shape and configured such that rear portions of the shock-absorbing members 10, i.e., the rear portions 22b of the covering bodies 22 of the covering members 20 and rear portions of the wood members 12, can be axially inserted thereinto. Further, each of the side members 5 may be provided with a pair of upper and lower stopper bolts 6b with which a rear end surface 10t of each of the shock-absorbing members 10 inserted into the side members 5 may make contact. The stopper bolts 6b may function as an insertion-limiting stopper of the shock-absorbing members 10. The stopper bolts 6b may laterally penetrate the side members 5. Nuts 6n may be attached to male screw portions formed in distal ends of the stopper bolts 6b, so that the stopper bolts 6b may be secured to the side members 5.

An insertion motion of the rear portions 22b of the shock-absorbing members 10 may be stopped when the rear end surface 10t of each of the shock-absorbing members 10 contact the pair of upper and lower stopper bolts 6b. In this condition, the rear flanges 24 of the covering members 20 of the shock-absorbing members 10 may respectively be connected to the flanged portions 5f of the side members 5 using the bolts B. Additionally, as shown in FIG. 7, the front flanges 23 may be connected to the bumper reinforcement member 3 using the bolts B in a condition in which the positioning projections 25 respectively formed in central portions of front end surfaces of the shock-absorbing members 10 (the central portions of the front flanges 23 of the covering members 20) are fitted into the positioning holes 3h formed in the bumper reinforcement member 3. Thus, attachment of the shock-absorbing members 10 to the vehicle may be completed.

As described above, the rear portions 22b of the shock-absorbing members 10 can be axially inserted into the side members 5. Therefore, an axial center of each of the side members 5 and an axial center of each of the wood members 12 of the shock-absorbing members 10 may be maintained coaxially with each other. Further, when the impact load F is applied to the shock-absorbing members 10 via the bumper reinforcement member 3, the shock-absorbing members 10 (the wood members 12) may be prevented from being inclined relative to the side members 5. That is, the wood members 12 of the shock-absorbing members 10 may receive the impact load F applied to the vehicle in the axis direction of the annual rings 12k between the bumper reinforcement member 3 and the stopper bolts 6b of the side members 5.

<Regarding Action of Shock-Absorbing Members 10>

As shown in FIG. 7 and FIG. 8, when the impact load F is applied to the bumper reinforcement member 3 due to the vehicle frontal collision, the impact load F may act on the shock-absorbing members 10 in such a direction as to push the shock-absorbing members 10 into the side members 5. At this time, the rear flanges 24 of the covering members 20 of the shock-absorbing members 10 may be broken, so that the shock-absorbing members 10 may be further pushed into the side members 5. Therefore, the impact load F is axially applied to the wood members 12 of the shock-absorbing members 10 (in the axis direction of the annual rings 12k) via the bumper reinforcement member 3 and the stopper bolts 6b of the side members 5. As a result, the stopper bolts 6b of the side members 5 may bite into the wood members 12 of the shock-absorbing members 10, so that the wood members 12 may be axially collapsed. Thus, the impact load F may be absorbed due to deformation or other such changes of the wood members 12.

<Advantages of Shock-Absorbing Members 10 of Present Embodiment>

In the shock-absorbing members 10 of this embodiment, both end surfaces of each of the wood members 12 in the axis direction of the annual rings 12k are hermetically covered by the sealing members 18 (the epoxy resin coating materials). Therefore, even if the air in the wood members 12 expanded by heat from the melted resin materials is forced to flow out of the wood members 12 during an injection molding process, the air can be shut off by the sealing members 18, so as to be prevented from flowing out of the end surfaces of each of the wood members 12. As a result, the air may be prevented from accumulating between the end surfaces of each of the wood members 12 and an inner surface of each of the covering members 20, so that the molding defects of each of the covering members 20 caused by inflation may be prevented. Further, because the shock-absorbing members 10 may be configured such that the rear portions 22b thereof may be axially inserted into the side members 5, the shock-absorbing members 10 (the wood members 12) may be prevented from being inclined relative to the side members 5 when the impact load F is applied thereto. Therefore, the wood members 12 may be accurately collapsed in the axis direction of the annual rings 12k. Further, because each of the covering members 20 may be provided with the front flange 23 and the rear flange 24, the wood members 12 may be positioned in place between the bumper reinforcement member 3 and the side members 5.

Modified Embodiment

The embodiment described above can be changed or modified without departing from the scope of the disclosure.

For example, in the embodiment, the epoxy resin coating materials are applied only to both end surfaces of each of the wood members 12 in the axis direction of the annual rings 12k. However, the epoxy resin coating materials may be applied to a whole surface of each of the wood members 12. Further, as shown in FIG. 5, the wood members 12 are formed into the rectangular columnar shape. Further, each of the wood members 12 is formed such that the axis direction of the annual rings 12k is aligned with the axis direction of the rectangular column. However, each of the wood members may be replaced with a rectangular columnar composite wood member composed of a plurality of wood pieces in which the wood pieces are arranged such that the axis direction of the annual rings 12k is aligned with the axis direction of the rectangular column (or a circular column). Further, in this embodiment, the rear flanges 24 of the shock-absorbing members 10 (the covering members 20) are respectively bolted to the flanged portions 5f of the side members 5, so that the shock-absorbing members 10 are respectively connected to the side members 5. However, bolt holes into which the pair of upper and lower stopper bolts 6b are inserted may be formed in a rear end portion of each of the covering members 20, so that the shock-absorbing members 10 (the covering members 20) may respectively be connected to the side members 5 by the stopper bolts 6b. Further, in this embodiment, the vehicle shock-absorbing members are exemplified. However, the shock-absorbing members may be used for buildings, railway trains, ships or the like.

The invention claimed is:

1. A shock-absorbing member in which a wood member is embedded in a resin covering member so as to be integrated therewith and in which the wood member is collapsed when subjected to an impact load, thereby absorbing a portion of the impact load,
    wherein sealing members are disposed between both end surfaces of the wood member in an axis direction of annual rings and an inner surface of the covering member, so as to hermetically cover both end surfaces of the wood member.

2. The shock-absorbing member as described in claim 1, wherein the sealing members comprise coating materials, films or plate members adhered to the end surfaces of the wood member.

3. The shock-absorbing member as described in claim 1, wherein one end side of the covering member covering one end side of the wood member in the axis direction of the annual rings is configured to be connected to a vehicle bumper reinforcement member, and
    wherein another end side of the wood member in the axis direction of the annual rings and another end side of the covering member covering another end side of the wood member are configured to be inserted into a tubular side member extending in a vehicle front-back direction and to contact an insertion-limiting stopper disposed in the side member.

4. The shock-absorbing member as described in claim 3, wherein the covering member has flanges respectively formed in one axial end side and an axial mid portion thereof and protruded therefrom in directions perpendicular to an axial center of the wood member, and
    wherein the flange formed in one end side of the covering member is configured to be connected to the bumper reinforcement member while the flange formed in the mid portion of the covering member is configured to be connected to a flanged portion of the side member.

5. A manufacturing method of a shock-absorbing member in which a wood member is embedded in a resin covering member so as to be integrated with the covering member and in which the wood member is collapsed when subjected to an impact load, thereby absorbing a portion of the impact load, comprising the steps of:
- covering both end surfaces of the wood member in an axis direction of annual rings by sealing members;
- setting the wood member of which the end surfaces in the axis direction of the annual rings are covered by the sealing members in a molding tool of an injection molding machine; and
- closing the molding tool of the injection molding machine and injecting melted resin materials into the molding tool so as to mold the covering member.

* * * * *